3,274,128
SILICON-CONTAINING POLY(NITRILOMETHYL-IDYNES)
Iral B. Johns, Marblehead, Mass., assignor, by mesne assignments, to Monsanto Research Corporation, St. Louis, Mo., a corporation of Delaware
No Drawing. Filed Jan. 30, 1964, Ser. No. 341,414
4 Claims. (Cl. 260—2)

This invention relates to new compounds, and more particularly, provides novel silicon-containing polymers and methods of making the same.

As is known, silicon-containing polymers can be prepared by hydrolyzing diorganosilicon compounds having small inorganic substituents such as halogen atoms attached to the silicon atom. The products of such hydrolysis of diorganosilicon compounds are the well known silicone polymers. However, silicon-containing polymers can also be made by other kinds of polymerization reactions, producing novel products having properties unlike those of the silicones.

It has now been found that diarylsilane cyanides can be converted to novel, valuable polymeric products by compressing and heating the diarylsilane cyanides, under pressures above about 1000 kg./sq. cm.

The polymeric products of the stated high-pressure polymerization are valuable novel silicon-containing compounds which can be employed for a variety of purposes. They swell and dissolve in organic solvents, and can be cast from such solutions to provide coherent films which adhere tightly even to such smooth substrates as glass. Generally, the present novel products are dark in color, and may be employed to provide opaque coatings. They may also be used as biological toxicants: for example, as herbicides, insecticides, fungicides, bactericides, nematocides or the like.

The present novel products are obtained by polymerization of a diarylsilane cyanide. The presently useful diarylsilane cyanides will contain at least two aromatic hydrocarbon substituents attached directly to the silicon atom by an aromatic ring carbon atom. The stated hydrocarbon radicals may contain from 6 to 18 carbon atoms. These diarylsilane cyanides will also contain at least one cyanide group attached directly to the silicon atom. The fourth valence of the silicon atom in these compounds will be attached to a substituent selected from a cyanide radical and a hydrocarbon radical of up to 18 carbon atoms.

The references herein to silane cyanides and to cyanide groups attached to the silicon atom are to be understood as indicating either a cyanide or an isocyanide group. As is known (see, for example, Eaborn, "Organosilicon Compounds," London, Butterworths, 1960, pages 219–226), there is considerable doubt as to whether any of the known organosilane pseudohalides have normal or iso structures, and the so-called cyanides may very possibly be mixtures of cyanides and isocyanides in equilibrium. At normal room temperatures, the cyanide appears to be the predominant structure, and the compounds are conveniently designated simply as cyanides.

Illustrative of the presently useful diarylsilane cyanides are, for example, dicyanodiphenylsilane
dicyanodi-o-tolylsilane
dicyanodi-p-tolylsilane
dicyanodi-2,4-xylylsilane
dicyanodi-α-naphthylsilane
dicyanobis(p-isopropylphenyl)silane
dicyanobis(p-t-butylphenyl)silane
di-p-biphenylyldicyanosilane
bis(p-benzylphenyl)dicyanosilane
dicyanophenyl(p-isopropylphenyl)silane
biphenylyldicyanophenylsilane
cyanomethyldiphenylsilane
biphenylylcyanodiphenylsilane
cyanododecyldiphenylsilane
dibiphenylylcyanophenylsilane
dicyanodiphenanthrylsilane
dicyanobis(2,4-diphenylphenyl)silane
and the like.

The polymeric products which have been obtained from a diarylsilane cyanide in accordance with the present invention have exhibited an elemnetal analysis corresponding to that of the original monomer. It is known that organic nitriles can be polymerized through the nitrile (cyano) group, forming cyclic polymers such as trimers, which are triazines, in which the monovalent nitrile group, —C≡N, has been converted to the divalent linking unit, —C=N—. The organic nitriles can also form higher molecular weight polymers having a similar repeating unit, which may or may not be cyclic. The polymers formed may be generally designated poly(nitrilomethylidynes), that is, compounds with repeating units of the formula: >C=N— in which the residual valence of the carbon atom is attached to the substituent originally attached to the cyano group in the monomer.

The presently provided polymers are believed to have an analogous structure, and are poly(nitrilomethylidynes) in which the carbon substituent is a silicon atom having two aryl substituents and a third substituent selected from a hydrocarbon radical, a cyano radical (or isocyano radical), or possibly, a further nitrilomethylidyne substituent. Thus these polymers will be of the formula

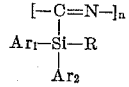

in which $Ar_1$ and $Ar_2$ are aromatic hydrocarbon radicals attached to the silicon atom by an aromatic ring carbon atom and R is a substituent selected from the class consisting of hydrocarbon radicals of up to 18 carbon atoms and a CN substituent, where CN indicates, indifferently, either a cyano radical, an isocyano radical or a nitrilomethylidyne divalent radical. The integer $n$ represents the number of repeating units, which is two or more.

In general, an oligomer is a low molecular weight polymer having, arbitrarily, a molecular weight below about 1500. The polymers provided by the present invention may include oligomers such as triazines and bis-triazines having diarylsilyl groups as the carbon atom substituents, and also higher molecular weight polymers, containing more than 6 monomer substituents in a chain.

Conversion of the diarylsilane cyanides to polymers in accordance with this invention is effected by maintaining the diarylsilane cyanide under elevated pressures until polymer formation has occurred. The diarylsilane cyanides may be compressed to effect their conversion to polymers alone or in admixture with one another. The reaction mixture may consist essentially of the diarylsilane cyanide or may include additional, inert constituents such as solvents.

Useful solvents include hydrocarbon solvents such as benzene, toluene and xylene, hexane, pentane and cyclohexane; oxygenated solvents, including ethers such as diethyl ether, dioxane and the dimethyl ether of ethylene glycol; amides such as diethylformamide, dimethylacetamide and so forth; nitriles such as acetonitrile; tertiary amine bases such as pyridine and triethylamine; sulfoxides such as dimethylsulfoxide; ketones such as methyl ethyl ketone, and so forth.

Temperatures used in conducting the polymerization may vary from down to where the reaction mixture is barely liquid up to any temperature below decomposition temperatures of the reaction mixture components. The rapidity of the reaction will vary with the reactants chosen, and in some cases the reaction may be exothermic and require cooling and/or diluents to moderate its violence, while other reactants may not undergo significant conversion until after hours at elevated temperature. In high pressure polymerizations in accordance with this invention, the temperature and pressure required for the conversion are usually interdependent. In general, the higher the pressure, the lower the temperature required to initiate the polymerization, and the higher the temperature, the lower the pressure. Preferably, temperatures above about 200° C. are employed. The conversion may be accelerated by elevating the temperature, and frequently for practicable reaction rates at reasonably low pressure, temperatures of 250° C. and above may be used.

The pressure at which the present polymerization is conducted will be above about 1000 kg./sq. cm. and preferably above about 5000 kg./sq. cm. Higher pressures, ranging up to 20,000 kg./sq. cm. or more, can be used if desired. In general, the range of 5000–10,000 kg./sq. cm. is particularly useful.

Catalysts are not necessary, although suitable catalytic materials, particularly ionic catalysts of polymerization such as a base, like an organic amine, for example, may be used if desired.

The time required to accomplish the reaction depends on functional factors such as the reactivity of the reactants, the temperature and pressure of reaction, and so forth. Reaction rates and times of reaction may vary considerably also depending on the details of apparatus and other operational conditions. By suitable arrangements, continuous procedures may be employed, or batch type operations.

On completion of the reaction, the polymer formed in the reaction may be separated by conventional methods such as precipitation, vaporization, distillation, extraction or the like. The polymeric product may if desired be separated into individual fractions of differing molecular weights by procedures such as extraction with differentiating solvents.

The invention is illustrated but not limited by the following examples.

EXAMPLE 1

This example illustrates conversion of a diarylsilane cyanide to a higher molecular weight product of the same empirical formula.

Dicyanodiphenylsilane is prepared as described by McBride, J. Org. Chem., 24, 2029 (1959). It is a water white liquid which boils at 122° C/0.24 mm., $n_D^{20}$ 1.5625 and $d_4^{26}$ 1.067. The calculated molar refraction indicates it to be the normal cyano compound, but the infrared spectrum has bands for both cyano and isocyano groups.

The bomb used for the polymerization is one useful for the pressure range up to 10,000 kg./sq. cm. It is 0.75 inch I.D., 3 inch O.D., 4 inches long and provided with Bridgman leak-proof closures. Heating is accomplished by means of an electrically heated jacket around the bomb. The bomb and plugs are made of red hard tool steel, heat treated for maximum toughness, Rockwell C hardness number 53–54.

To effect conversion of the silane compound to the polymer, 3 grams (g.) of dicyanodiphenylsilane in a thin-walled lead tube is put in the cylinder and surrounded by oil. Pressure in the cylinder is raised to 7600 kg./sq. cm. (kilograms per square centimeter) and the cylinder is heated to 253° C., which temperature is maintained for one hour. Reaction is indicated by a steady decrease of volume. After cooling, the reaction product is removed from the bomb. The weight of the charge in the lead tube has not changed. The product of this heat treatment of the clear colorless liquid monomer is a black shiny solid which softens at 125° C. and flows at 150° C. The condensation is through the —C≡N group as shown by the infrared spectrum, which exhibits loss of —C≡N absorption and appearance of —C=N— absorption.

EXAMPLE 2

This example illustrates recovery of polymers of a diarylsilane cyanide and utilization of such polymers as coating materials.

A Soxhlet extractor is employed to extract the polymeric product obtained as described in Example 1, with benzene. The benzene-extracted higher molecular weight polymeric residue and the benzene-soluble fraction of the polymeric product are each black materials.

The lower molecular weight (degree of polymerization 4–5), benzene-soluble extracted polymer is dissolved in methyl ethyl ketone; and the higher molecular weight residue of the extraction is dissolved in dimethylformamide. The solutions are spread onto glass plates and the solvent allowed to evaporate at ambient temperatures (70–75° F., generally). After evaporation, it is found that the glass plates are covered by an opaque adherent film. When a little of the lower molecular weight polymer is melted and compressed between two glass plates, it forms a tight bond to each of the plates, acting as an adhesive between them.

While the invention has been described with specific reference to particular preferred embodiments thereof, it will be appreciated that modifications and variations can be made without departure from the scope of the invention, which is limited only as defined in the appended claims.

What is claimed is:

1. The method of polymerizing a diarylsilane cyanide which comprised compressing and heating a reaction mass consisting essentially of a diarylsilane cyanide of the formula

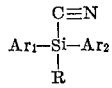

in which $Ar_1$ and $Ar_2$ are aromatic hydrocarbon radicals of from 6–18 carbon atoms joined to the silicon atom by an aromatic ring carbon atom, and R is a substituent selected from the class consisting of hydrocarbon radicals of up to 18 carbon atoms and cyano radicals, at a temperature of above about 200° C. and a pressure above about 1000 kg./sq. cm.

2. Poly(nitrilomethylidynes) in which the substituents of the carbon atoms are diarylsilyl substituents of the formula

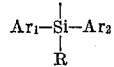

in which $Ar_1$ and $Ar_2$ are each aromatic hydrocarbon radicals of from 6–18 carbon atoms joined to the silicon atom by an aromatic ring carbon atom and R is a radical selected from the class consisting of hydrocarbon radicals of up to 18 carbon atoms and cyano radicals.

3. Poly(nitrilomethylidynes) in which the substituents of the carbon atoms are cyanodiphenylsilyl radicals.

4. The method of producing a silicon-containing polymer which comprises compressing and heating a reaction mass consisting essentially of dicyanodiphenylsilane to a temperature of above about 200° C. and a pressure of above about 1000 kg./sq. cm.

References Cited by the Examiner

UNITED STATES PATENTS 3,020,246  2/1962  Fierce et al. _____ 260—2
3,032,575  5/1962  Freitag et al. _____ 260—448.2

OTHER REFERENCES

McBride, J. Org. Chem. 24, 2029 (1959).

LEON J. BERCOVITZ, *Primary Examiner.*

M. I. MARQUIS, *Assistant Examiner.*